(12) United States Patent
Senba et al.

(10) Patent No.: US 7,600,932 B2
(45) Date of Patent: Oct. 13, 2009

(54) CAMERA SYSTEM FOR ATTACHING LENS UNIT TO ELECTRONICS DEVICE

(75) Inventors: Takehiko Senba, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 595 days.

(21) Appl. No.: 11/403,918

(22) Filed: Apr. 14, 2006

(65) Prior Publication Data
US 2006/0233545 A1    Oct. 19, 2006

(30) Foreign Application Priority Data
Apr. 14, 2005    (JP)  ............................ 2005-117438

(51) Int. Cl.
*G03B 17/00* (2006.01)
*G02B 7/02* (2006.01)
(52) U.S. Cl. ........................ 396/529; 396/532; 359/827
(58) Field of Classification Search ................ 396/301, 396/529, 532; 348/14.01; 375/220
See application file for complete search history.

(56) References Cited

U.S. PATENT DOCUMENTS 6,101,339 A * 8/2000 Miki et al. .................. 396/301

7,397,495 B2 * 7/2008 Girish et al. ............. 348/14.01
2004/0247023 A1 * 12/2004 Sasai et al. .................. 375/220

FOREIGN PATENT DOCUMENTS

| JP | 8-227096 | * | 3/1996 |
| JP | 08-227096 | A | 9/1996 |
| JP | 2000-050138 | A | 2/2000 |

OTHER PUBLICATIONS

"iSight User's Guide", 32 pages, copyright 2004.*

* cited by examiner

*Primary Examiner*—Melissa J Koval
(74) *Attorney, Agent, or Firm*—Sughrue Mion, PLLC (57) ABSTRACT

A camera system is composed of a lens unit and a camera body. The lens unit has a built-in CCD. A magnet is embedded in a protrusion of the lens unit. A case of the camera body is made of a magnetic material. In virtue of this, it is possible to attach the lens unit to any position of the camera body on condition that functions of the camera body are not disturbed by the lens unit. Incidentally, a cable is utilized to perform data transmission and electric-power transfer between the lens unit and the camera body.

19 Claims, 9 Drawing Sheets

CAMERA SYSTEM FOR ATTACHING LENS UNIT TO ELECTRONICS DEVICE

FIELD OF THE INVENTION

The present invention relates to a camera system comprising a lens unit containing a taking lens and an imaging device, and an electronics device to which the lens unit is attached.

BACKGROUND OF THE INVENTION

An electronic camera with interchangeable lenses is known. In this kind of the electronic camera, various lens units (interchangeable lenses) are interchanged to perform desired shooting. The electronic camera with the interchangeable lenses is composed of the lens unit and a camera body. In general, an imaging device for taking a subject image is disposed in the camera body.

However, when the imaging device is disposed in the camera body, it is necessary to optically connect a lens group of the lens unit to the imaging device of the camera body. Thus, technical knowledge is sometimes required and there arises a problem in that handling is difficult for beginners.

In consideration of this, it is proposed to dispose the imaging device in the lens unit of the lens-interchangeable electronic camera. Such a kind of the electronic camera has an advantage that handling is simplified. Moreover, there is another advantage that dust or the like is prevented from adhering to the imaging device, since it is possible to seal up the lens unit in a state that the imaging device is built therein.

By the way, as to an attachment way for attaching the lens unit to the camera body, various ways are known. Some of the attachment ways adopt a bayonet style, and some of them utilize a magnet.

Japanese Patent Laid-Open Publication No. 8-227096 teaches a camera in which a lens unit is attached by using magnets. In this camera, a mounting plate of the camera body is provided with the magnets, and a rear surface of the lens unit is provided with magnetic members to be attracted by the magnets which are disposed along the periphery of the mounting plate. All center angles, each of which is formed between any two magnets, are adapted to be different to each other. Meanwhile, the magnetic members are disposed so as to keep a mirror image relation relative to the magnets. After pressing the rear surface of the lens unit against the mounting plate of the camera body, the lens unit is rotated so that the lens unit is set to a predetermined attachment position of the camera body.

Japanese Patent Laid-Open Publication No. 2000-50138 teaches an electronic camera in which a lens unit is attached via a connection plate. This electronic camera is of a type that an imaging device is disposed in a lens unit. In this electronic camera, the lens unit is provided with an engagement claw and a camera body is provided with the connection plate having an engagement portion with which the engagement claw engages. After pressing the lens unit against the camera body via the connection plate, the lens unit is slid to engage the engagement claw with the engagement portion so that the lens unit is set to a predetermined attachment position of the camera body.

As to the lens-interchangeable electronic camera of the type that the imaging device is disposed in the lens unit, it is unnecessary to exclusively attach the lens unit to the predetermined attachment position of the camera body. Thus, it is preferable to use an attachment way which is more appropriate in comparison with a conventional attachment way such as described in the above-noted Publications.

In the coming years, the lens unit will become small, lightweight and inexpensive with the rise of technology, and various lens units will be provided. Thus, it is especially desired to obtain a structure in which the lens unit can be easily attached and detached.

SUMMARY OF THE INVENTION

In view of the foregoing, it is a primary object of the present invention to provide a user-friendly camera system with interchangeable lenses.

In order to achieve the above and other objects, the camera system according to the present invention comprises a lens unit, an electronics device to which the lens unit is attached, an attachment device, a communication device and a display. The lens unit contains a taking lens and an imaging device disposed behind the taking lens. The attachment device enables the lens unit to be attached to different positions of an outer surface of the electronics device on condition that functions of the electronics device are not disturbed. The communication device performs data communication between the lens unit and the electronics device equipped with the display, which captures image data of the imaging device via the communication device to display the image data as an image.

In a preferred embodiment, the attachment device comprises a magnet and a magnetic material. The magnet is disposed at one of outer surfaces of the lens unit and the electronics device, and the magnetic material is disposed at the other of the outer surfaces thereof. In another embodiment, the attachment device comprises a first sheet of hooks, which are made of resin, and a second sheet of loops, which engage with the hooks and are made of resin. The first sheet is attached to one of the outer surfaces of the lens unit and the electronics device, and the second sheet is attached to the other of the outer surfaces thereof. It is preferable that the first and second sheets are hook and loop fasteners. In the other embodiment, the attachment device is an adhesive member. In the other embodiment, the attachment device comprises a first engagement member and second engagement members to be engaged with the first engagement member. The first engagement member is disposed at the outer surface of the lens unit, and the second engagement members are disposed at the outer surface of the electronics device. The first engagement member is selectively and detachably attached to one of the second engagement members.

It is preferable that the electronics device comprises a recorder for recording the image data captured via the communication device. Further, it is preferable that the electronics device comprises an attachment detection device for detecting the lens unit attached to the electronics device, and a controller for executing a preparative operation for shooting on the basis of a detection result of the attachment detection device. It is preferable to transfer electric power from the electronics device to the lens unit in a cableless manner utilizing electromagnetic induction. It is preferable that the communication device adopts a radio communication.

According to the camera system of the present invention, a shooter can attach the lens unit to a desired position of the electronics device. In virtue of this, for example, when the electronics device is a camera body, it is possible to freely change a grasp area of the camera body. Further, in this case, it is possible to shoot a subject residing in a direction different from a front direction of the camera body. Usability of the camera system is improved.

When the attachment device comprises the magnet and the magnetic material, it is possible to attach the lens unit only by bringing the lens unit close to the electronics device and it is possible to detach the lens unit only by separating the lens unit from the electronics device. Thus, attaching and detaching operations of the lens unit are very simplified. When the attachment device comprises the spikey-hooks sheet and the fuzzy-loops sheet, the attaching and detaching operations of the lens unit are similarly simplified. When the attachment device is the adhesive member, the attaching and detaching operations of the lens unit are similarly simplified. Incidentally, attaching the sheets and the adhesive member to the lens unit and/or the electronics device are very easy.

Since the attachment detection device and the controller are provided, the preparative operation for shooting is executed after detecting the attachment of the lens unit so that consumption of the electric power may be reduced.

When the electric power is transferred from the electronics device to the lens unit in the cableless manner, a power cable for transferring the electric power is unnecessary so that an operation for connecting the power cable is eliminated. In the meantime, when the communication device adopts the radio communication, a communication cable is unnecessary so that an operation for connecting the communication cable is eliminated. When the camera system adopts the cableless manner, usability thereof is further improved.

DESCRIPTION OF THE PREFERRED EMBODIMENTS

First Embodiment

Figure 1:
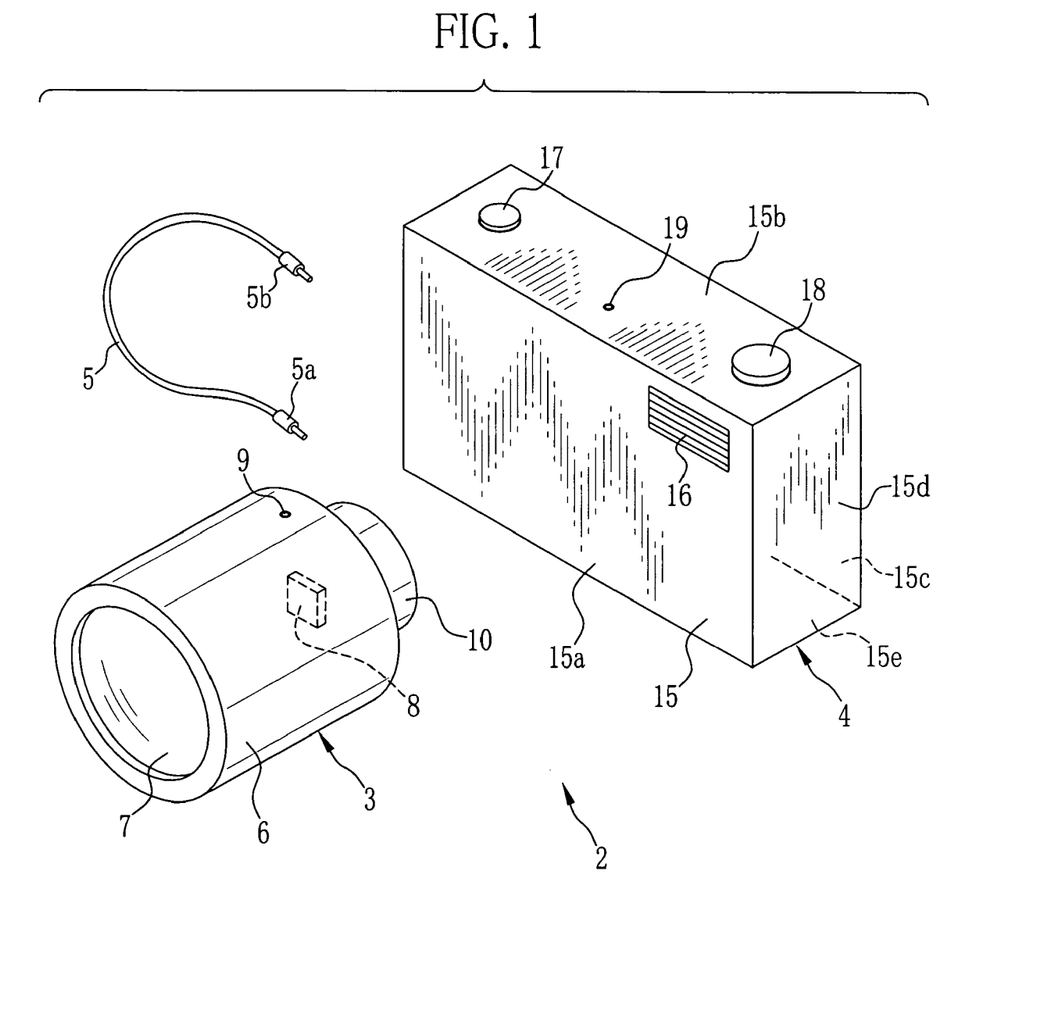
FIG. 1 is a perspective view of a camera system.

As shown in FIG. 1, a camera system 2 is composed of a lens unit 3 and a camera body (electronic device) 4 to which the lens unit 3 is attached. The lens unit 3 and the camera body 4 are connected via a cable 5 so that data transmission and power transfer are performed between them.

Figure 2:
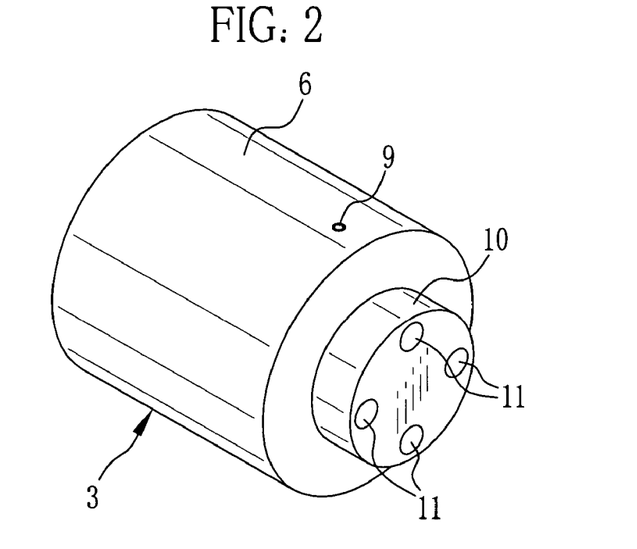
FIG. 2 is a perspective view of a lens unit.

The lens unit 3 includes a lens barrel 6 containing a taking lens 7 and a CCD 8 for taking a subject image formed by the taking lens 7. An outer surface of the lens barrel 6 is provided with a connecting terminal 9 to which one end 5a of the cable 5 is connected. As shown in FIG. 2, a rear side of the lens barrel 6 is provided with a cylindrical protrusion 10. Magnets 11 are fitted into a rear portion of the protrusion 10. The inside of the lens unit 3 is sealed so that dust or the like is prevented form intruding therein.

As shown in FIG. 1, the camera body 4 includes a case 15 having a front wall 15a, an upper wall 15b, a rear wall 15c, a side wall 15d and a bottom wall 15e. The case 15 is made of a magnetic material, for example which is a metal of iron and so forth. The case 15 forms an outer surface of the camera body 4.

The front of the camera body 4 is provided with a flash emitting portion 16 of a flash unit. In the front wall 15a of the case 15, an opening is formed to expose the flash emitting portion 16. The front wall 15a is a flat area except for the opening.

The upper surface of the camera body 4 is provided with a release button 17, a mode switch 18 and a connecting terminal 19. The release button 17 is depressed at a time of shooting. The mode switch 18 is operated at a time when shooting and reproducing modes are switched. To the connecting terminal 19, the other end 5b of the cable 5 is connected. Openings for exposing these components are formed in the upper wall 15b of the case 15.

Figure 3:
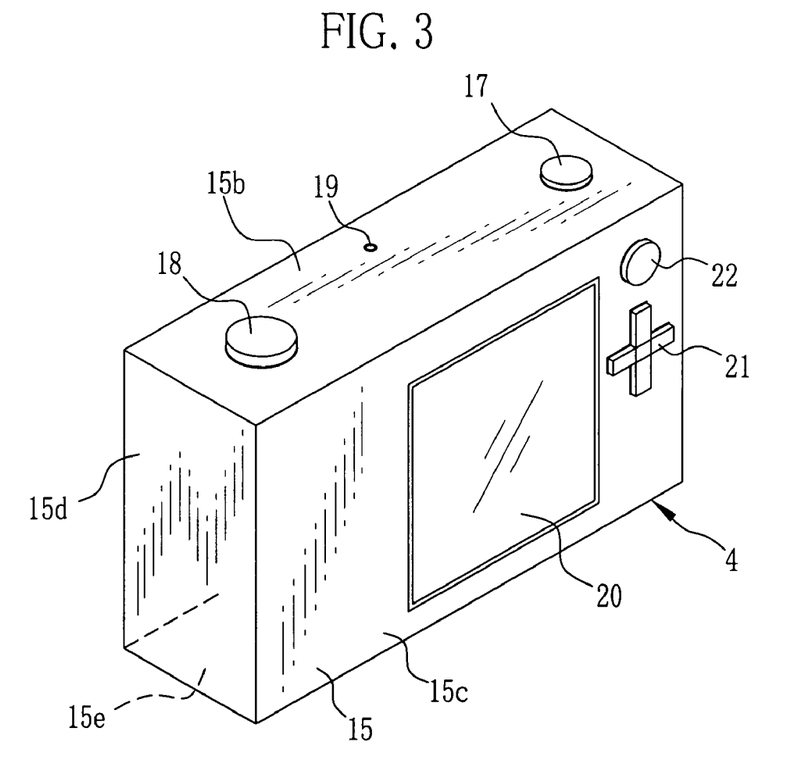
FIG. 3 is a perspective view of a camera body.

As shown in FIG. 3, the rear of the camera body 4 is provided with a liquid-crystal panel (hereinafter LCD) 20 for displaying an image and so forth, an LCD operating portion 21 and a power button 22. Openings for exposing these components are formed in the rear wall 15c of the case 15. The rear wall 15c has a flat area formed at a lateral position of the opening through which the LCD 20 is exposed. The flat area is larger than the rear surface of the protrusion 10 (see FIG. 2). Moreover, each of the side wall 15d and the bottom wall 15e of the case 15 also has a flat area which is formed so as to be larger than the rear surface of the protrusion 10.

Figure 4:
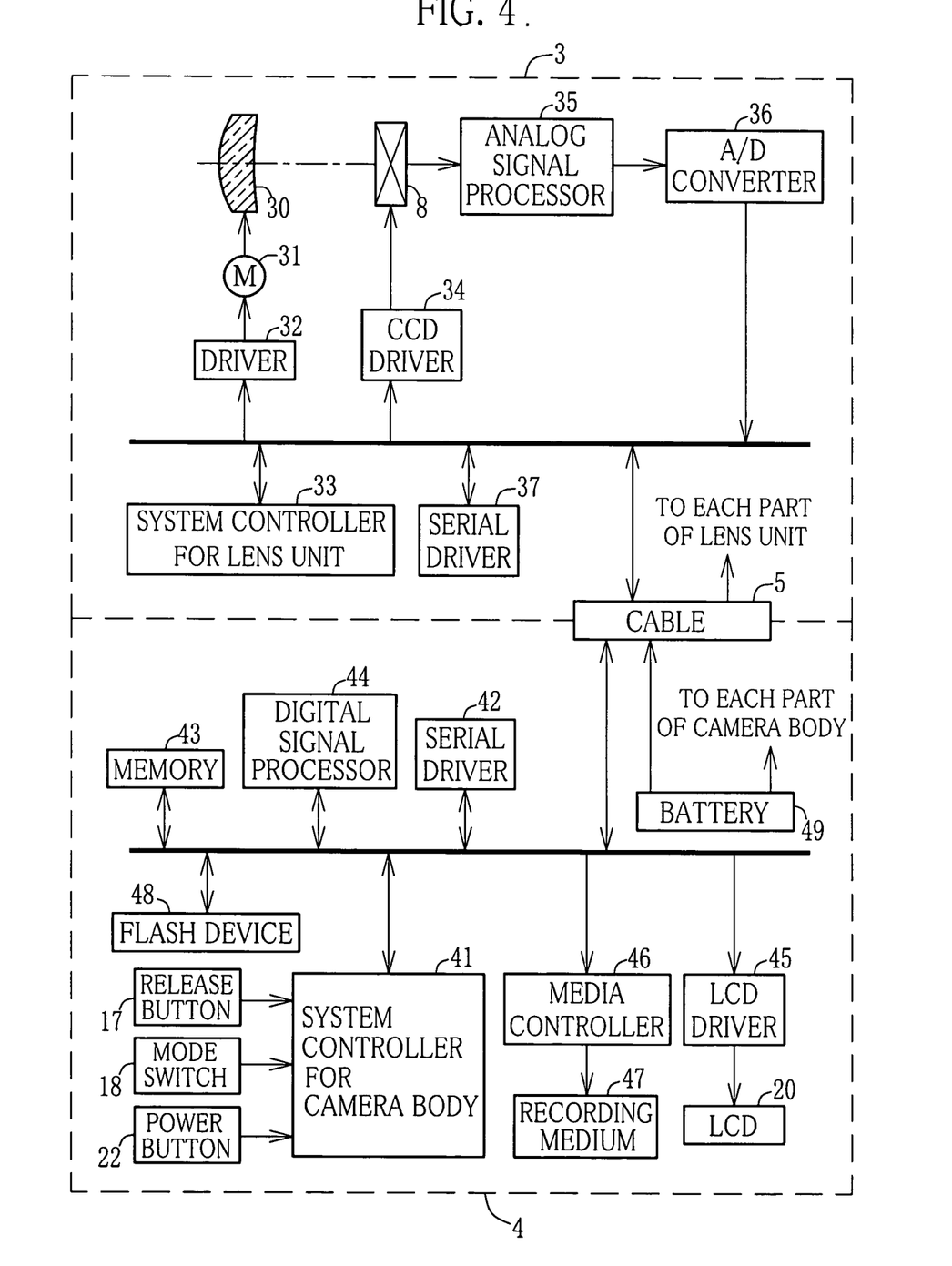
FIG. 4 is a block diagram showing an electrical structure of the camera system.

As shown in a block diagram of FIG. 4, a focus lens group 30 constituting a part of the taking lens 7 is driven by a focus motor 31 and moves inside the lens unit 3. The focus motor 31 is controlled by a system controller 33, which is for the lens unit 3, via a focus motor driver 32. The system controller 33 evaluates image contrast on the basis of an image signal outputted from the CCD 8, and then calculates a movement amount of the focus lens group 30.

The system controller 33 drives and controls the CCD 8 via a CCD driver 34. The CCD 8 converts the optical subject image into an electrical image signal. The converted image signal is outputted from the CCD 8 and is inputted into an analog signal processor 35 which possesses a function of performing correlation double sampling for the image signal to remove noises. The analog signal processor 35 possesses another function of amplifying the image signal.

The image signal outputted from the analog signal processor 35 is digitally converted into image data by means of an A/D converter 36. The converted image data is transmitted to the camera body 4 via a serial driver 37. As described above, the cable 5 is used for transmitting the data between the lens unit 3 and the camera body 4. The system controller 33 executes shooting processing, image processing and so forth of the lens unit 3, communicating with a system controller 41 used for the camera body 4.

The image data from the lens unit 3 is written in a memory 43 via a serial driver 42. A digital signal processor 44 reads the image data out of the memory 43 and performs gradation conversion, white balance correction, gamma correction and so forth. The image data for which various processes have been performed is inputted into an LCD driver 45 and is displayed on the LCD 20 as a through image.

The system controller 41 is connected to the release button 17, the mode switch 18 and the power button 22. Upon depression of the release button 17, the processed image data is recorded in a recording medium 47 by means of a media controller 46. In addition, a flash device 48 is driven upon depression of the release button 17. The flash device 48 is driven in accordance with a light amount of shooting condition to activate the flash emitting portion 16 (see FIG. 1). The system controller 41 executes shooting processing, image display processing, record processing and so forth of the camera body 4, communicating with the system controller 33.

A battery 49 is disposed in the camera body 4 to supply electric power to each part of the camera body 4. The battery 49 also supplies electric power to each part of the lens unit 3 via the cable 5.

An operation of the above structure is described below. Upon bringing the rear surface of the protrusion 10 of the lens barrel 6 close to the flat area of the case 15, the lens unit 3 is attached to the camera body 4 by virtue of magnetic force of the magnet 11. At this time, a shooter can attach the lens unit 3 to any flat area of the case 15. However, the area where function of the camera body 4 is disturbed is excluded. In other words, the area overlapping with the flash emitting portion, the release button 17 and so forth is excluded.

Figure 5:
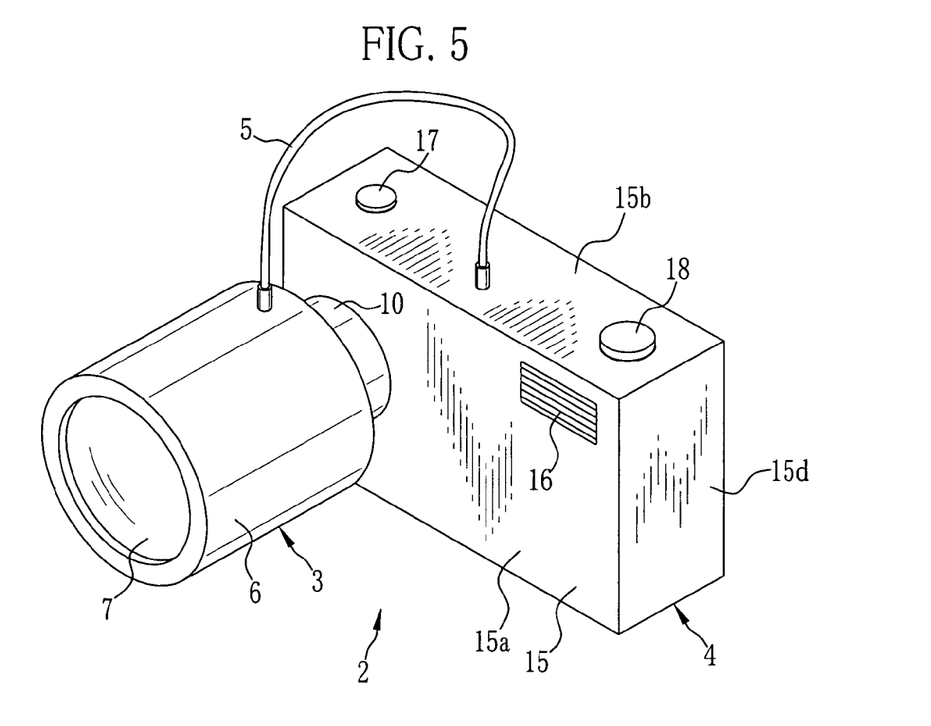
FIG. 5 is a perspective view of the camera system in which the lens unit is attached to a front end portion of the camera body.

For example, it is possible to attach the lens unit 3 to one side portion (separated from the flash emitting portion 16) of the front wall 15*a* of the case 15 such as shown in FIG. 5. In this case, at a time of shooting, the shooter can easily grasp the other side portion (located near the flash emitting portion 16) of the case 15 with a left hand.

Figure 6:
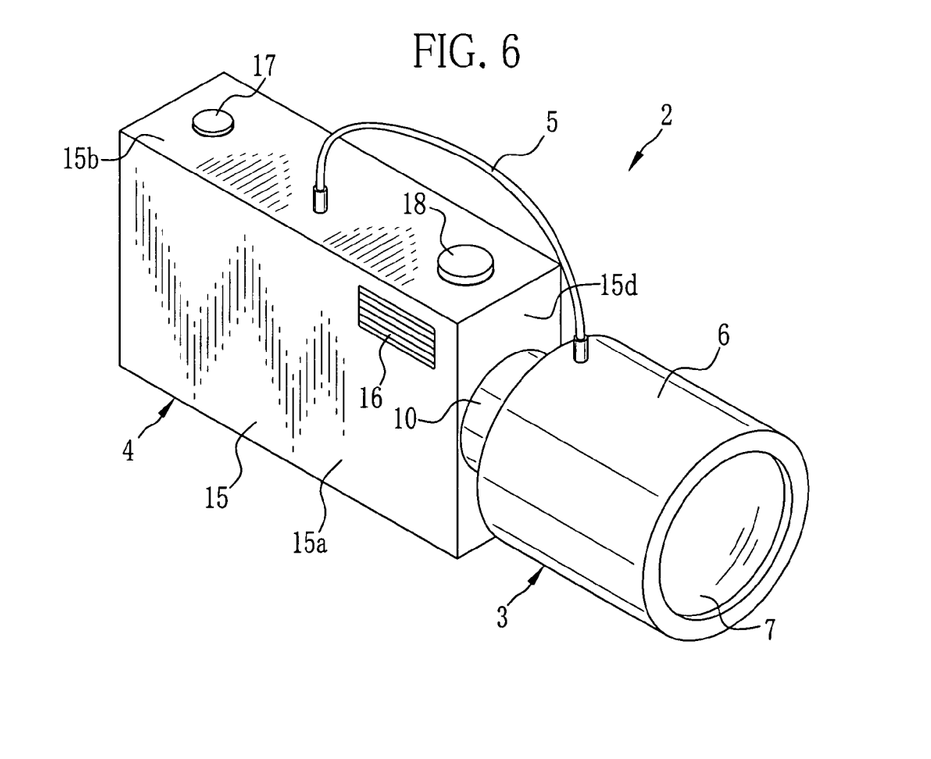
FIG. 6 is a perspective view of the camera system in which the lens unit is attached to a lateral side of the camera body.

For example, it is also possible to attach the lens unit 3 to the side wall 15*d* of the case 15 such as shown in FIG. 6. In this case, a subject residing in a direction perpendicular to a forward direction of the front of the camera body 4 is displayed on the LCD 20 and is taken. When the lens unit 3 is attached to the flat area of the rear wall 15*c* (see FIG. 3) of the case 15, it is possible to display the shooter on the LCD 20 at a time of shooting and it is possible to take the shooter. The lens unit 3 may be attached to the upper wall 15*b* and the bottom wall 15*e* of the case 15 (see FIGS. 1 and 3).

When the lens unit 3 and the camera body 4 are connected via the cable 5, these are electrically connected. Power supply is turned on by depressing the power button 22 of the camera body 4, and the shooting mode is selected by operating the mode switch 18. Upon this, the focus lens group 30 moves to perform focusing. The LCD 20 displays a through image and a shootable condition is set. The release button 17 is depressed to perform shooting. The image data obtained at this time is recorded in the recording medium 47.

According to the camera system of the present invention, it is possible to attach the lens unit to any position of the camera body. In addition, the lens unit is easily attached and detached. Thus, usability of the camera system is extremely improved.

In the above embodiment, the lens unit is provided with the magnet and the camera body is provided with the magnetic material. However, the lens unit may be provided with the magnetic material and the camera body may be provided with the magnet.

In the above embodiment, the cable is used for performing the data transmission and the power transfer between the lens unit and the camera body. However, it is possible to adopt a cableless manner wherein the data is transmitted by means of radio communication and the electric power is transferred by utilizing electromagnetic induction.

Figure 7:
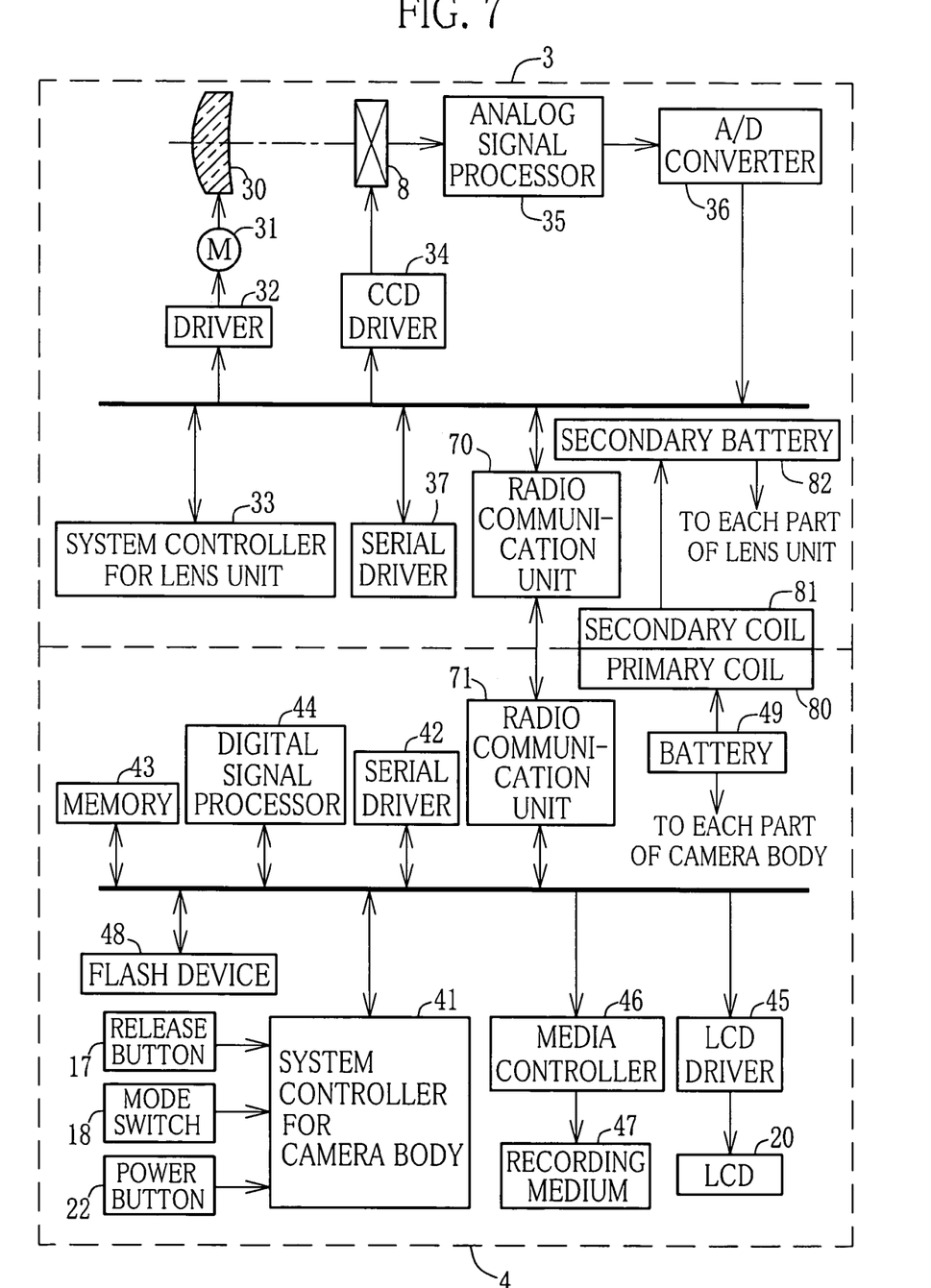
FIG. 7 is a block diagram showing an electrical structure of the cableless camera system.

In this case, such as shown in a block diagram of FIG. 7, the radio communication is composed of a radio communication unit 70 of the lens unit 3 and a radio communication unit 71 of the camera body 4. Each of the communication units 70 and 71 comprises a transmitter and a receiver. The transmitter sends radio waves including varied information. The receiver receives the radio waves. The radio communication unit 70 is connected to the system controller 33 and is controlled thereby. Meanwhile, the radio communication unit 71 is connected to the system controller 41 and is controlled thereby. By means of this radio communication, it is possible to transmit varied information of image data, operational information and so forth between the lens unit 3 and the camera body 4 similarly to the case using the cable.

Further, as shown in the block diagram of FIG. 7, the electric power is transferred by a primary coil 80, which is disposed in the camera body 4, a secondary coil 81 and a secondary battery 82, which are disposed in the lens unit 3. The primary coil 80 is located at a rear central portion of the front wall 15*a* (see FIG. 1) of the camera body 4. The secondary coil 81 is located at the inside of the protrusion 10 (see FIG. 1) of the lens unit 3. When the lens unit 3 is attached to the central portion of the front wall 15*a* of the camera body 4, the primary and secondary coils 80 and 81 are adjacent.

The primary coil 80 is connected to the battery 49 and receives electric power therefrom to change surrounding magnetic fields. When the secondary coil 81 approaches to the primary coil 80, the secondary coil 81 causes electromotive force by virtue of electromagnetic induction and stores electric power in the secondary battery 82, which supplies the electric power to each part of the lens unit 3. Similarly to the case using the cable, it is possible to transfer the electric power between the lens unit 3 and the camera body 4. When using the camera system 2 in a state that the lens unit 3 is attached to any area excepting the central portion of the front wall 15*a* of the camera body 4, the lens unit 3 is attached to the non-central portion after the secondary battery 82 has been charged. And then the camera system 2 is used.

Incidentally, the camera body may be provided with a plurality of primary coils so that the electric power is supplied to the secondary battery without regard to the position of the lens unit attached to the camera body. In this case, it is possible to use the camera system without worrying about the charge of the secondary battery.

In virtue of the cableless structure such as shown in FIG. 7, it is unnecessary to connect the cable. Thus, usability of the camera system is further improved.

Figure 8:
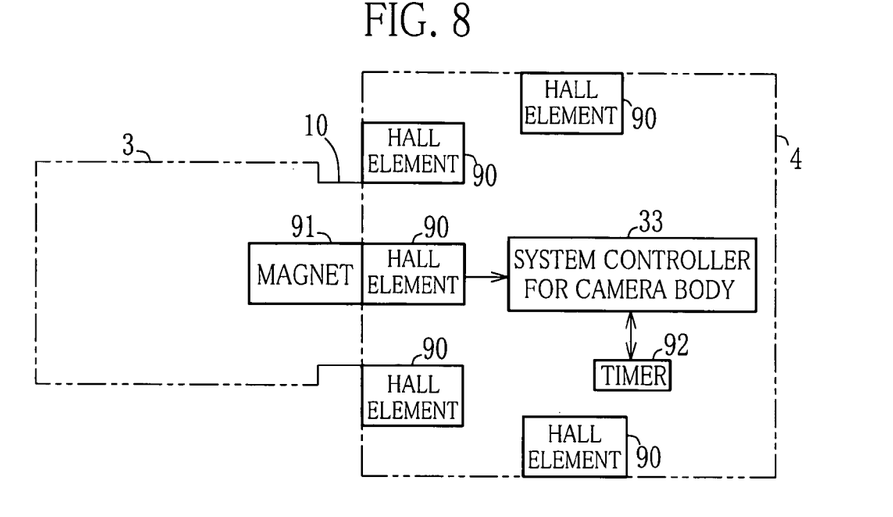
FIG. 8 is an explanatory illustration schematically showing the camera system comprising hall elements.

The camera system may include a detector for detecting the attachment of the lens unit. In this case, such as shown in FIG. 8, the detector comprises hall elements 90 and a magnet 91 to be used for detecting the attachment. The hall elements 90 are disposed at the rear side of the case 15 of the camera body 4. The magnet 91 is embedded in the protrusion 10 of the lens unit 3. The magnet 91 is adapted to approach one of the hall elements 90 when the lens unit 3 is attached to the camera body 4. The hall element 90 sends a detection signal to the system controller 33 when detecting magnetism. A timer 92 is connected to the system controller 33. The timer 92 starts counting a time in concurrence with the detection of the magnetism to measure the duration during which the magnetism is detected. The system controller 33 controls each part of the camera system 2 on the basis of the detection signal outputted from the hall element 90 and the duration measured by the timer 92. The following description relates to an operation of the camera system 2 comprising the detector for detecting the attachment.

Figure 9:
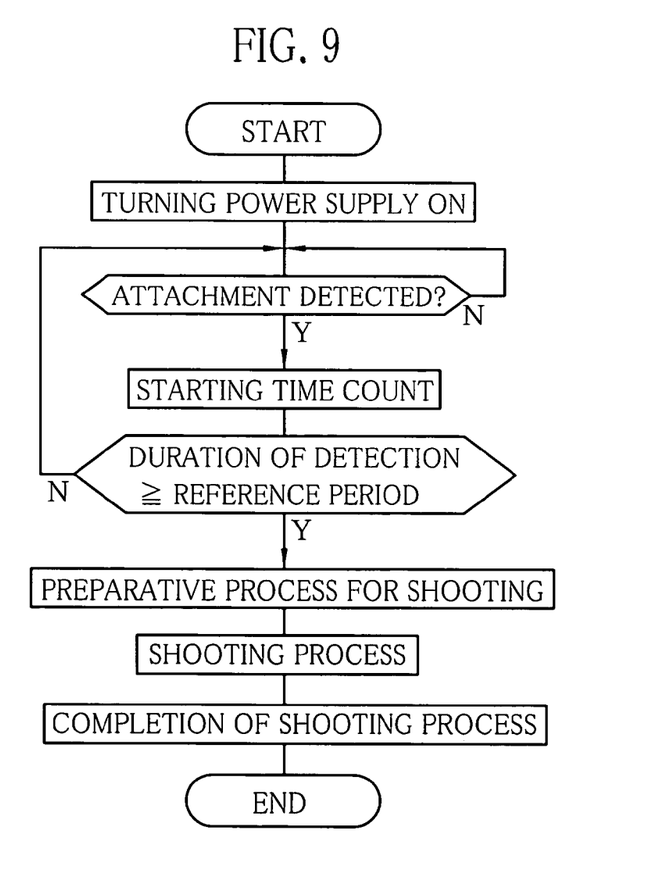
FIG. 9 is a flowchart showing a sequence of a shooting preparation operation performed after detecting the attachment of the lens unit.

As shown in a flowchart of FIG. 9, the power supply of the camera body 4 is turned on before attaching the lens unit 3 to the camera body 4. Upon attaching the lens unit 3 to the camera body 4, the timer 92 starts counting the time. When the duration measured by the timer 92 has exceeded a reference period, a preparative operation for shooting is performed. In this preparative operation, the CCD 8 contained in the lens unit 3 is activated and the focus lens group 30 is moved to carry out focusing. Meanwhile, in case the detection signal from the hall element 90 is stopped before the duration measured by the timer 92 exceeds the reference period, the preparative operation for shooting is not performed. The preparative operation for shooting is performed only when the duration exceeds the reference period. Thus, it is prevented that the attachment of the lens unit is mistakenly detected. In the camera system including the detector for detecting the attachment, the preparative operation for shooting is performed only when needed. Thus, it is possible to save the electric power.

Incidentally, the detector for detecting the attachment is not limited to the above-described structure using the hall elements and the magnet. For instance, the detector may employ a mechanical switch mechanism and an optical sensor.

Second Embodiment

This embodiment relates to another camera system having a structure different from the first embodiment. The camera system of the first embodiment uses the magnet and the magnetic material to attach the lens unit. However, the camera system of the second embodiment uses a hook and loop fastener as an attachment member. In the description concerning the second embodiment, a component identical with that of the first embodiment is denoted by the same reference numeral and the description thereof is omitted.

Figure 10:
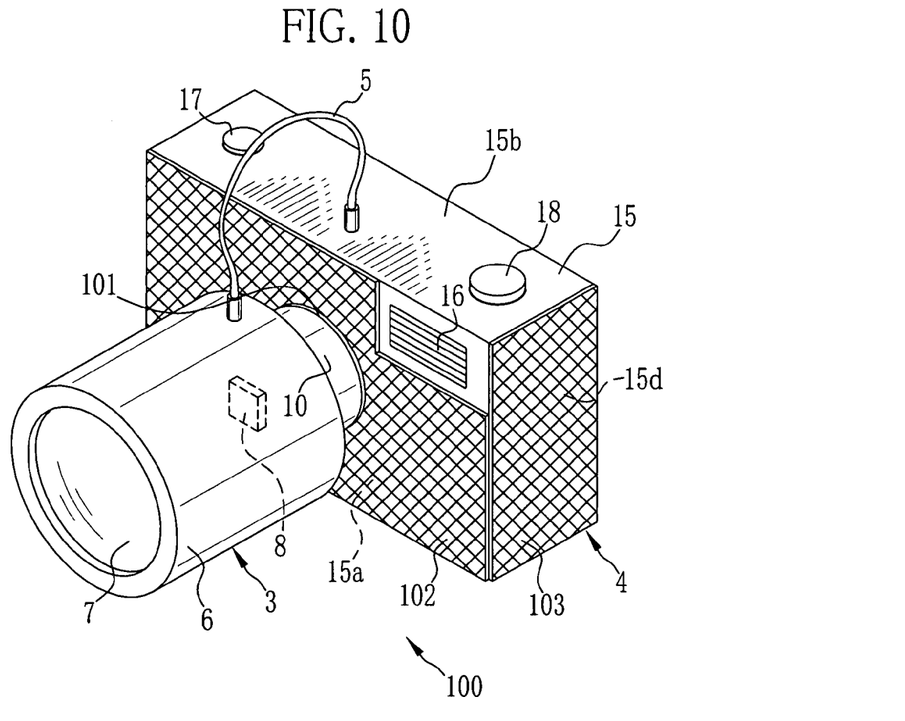
FIG. 10 is a perspective view of the camera system of a second embodiment.

As shown in FIG. 10, the camera system 100 is composed of the lens unit 3 and the camera body 4. A tape 101 of spikey hooks is attached to the rear surface of the protrusion 10 of the lens unit 3. Moreover, a tape 102 of fuzzy loops is attached to the surface of the front wall 15a of the camera body 4 so as not to overlap with the flash emitting portion 16. To the side wall 15d of the camera body 4, a tape 103 of fuzzy loops is attached. Although illustration is omitted in FIG. 10, a tape of fuzzy loops is also attached to the rear wall 15c of the case 15 (see FIG. 3) and the bottom wall 15e thereof (see FIGS. 1 and 3). The spikey hook is made of resin and engages with the fuzzy loop also made of resin.

The shooter can attach and detach the lens unit 3 relative to the camera body 4 by pressing the rear surface of the protrusion 10 of the lens unit 3 against the case 15 of the camera body 4 and by separating this rear surface from the case 15. In addition, the shooter can attach the lens unit 3 to any position of the camera body 4 on condition that functions of the camera body 4 are not disturbed. In virtue of this, usability of the camera system 100 is improved.

Incidentally, the camera system of the second embodiment may adopt the cableless manner described in the first embodiment and may comprise the detector for detecting the attachment of the lens unit, which is also described in the first embodiment.

Third Embodiment

This embodiment relates to the other camera system having a structure different from the first and second embodiments. The camera system of the third embodiment uses an adhesive tape as an attachment member. In the description concerning the third embodiment, a component identical with that of the first embodiment is denoted by the same reference numeral and the description thereof is omitted.

Figure 11:
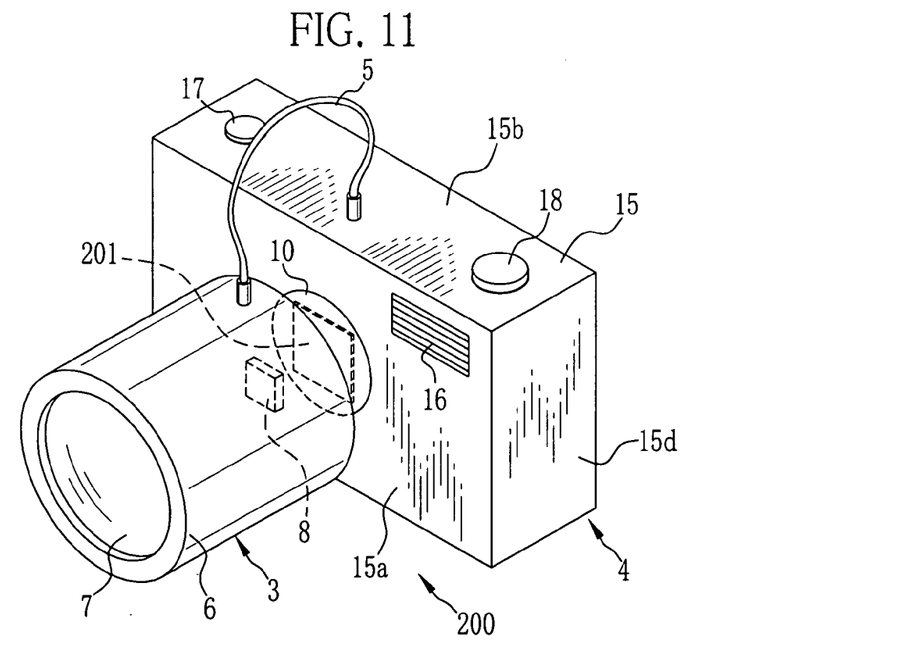
FIG. 11 is a perspective view of the camera system of a third embodiment.

As shown in FIG. 11, the camera system 200 is composed of the lens unit 3 and the camera body 4. A two-sided adhesive tape 201 having a rectangular shape is pasted on the rear surface of the protrusion 10 of the lens unit 3. Composition of the two-sided adhesive tape 201 is not especially limited. Adhesive layers may be formed at both sides of a paper sheet. Alternatively, flexible resin having adhesion may be employed. The shooter can attach and detach the lens unit 3 relative to the camera body 4 by pressing the rear surface of the protrusion 10 of the lens unit 3 against the case 15 of the camera body 4 and by separating this rear surface from the case 15. In addition, the shooter can attach the lens unit 3 to any position of the camera body 4 on condition that functions of the camera body 4 are not disturbed. In virtue of this, usability of the camera system 200 is improved.

In the third embodiment, the case 15 may be made of any material. However, it is preferable to use a material making the detachment of the adhesive tape easy. The camera system of the third embodiment may adopt the cableless manner described in the first embodiment and may comprise the detector for detecting the attachment of the lens unit, which is also described in the first embodiment.

Fourth Embodiment

This embodiment relates to the other camera system having a structure different from the first to third embodiments. In the description concerning the fourth embodiment, a component identical with that of the first embodiment is denoted by the same reference numeral and the description thereof is omitted.

Figure 12:
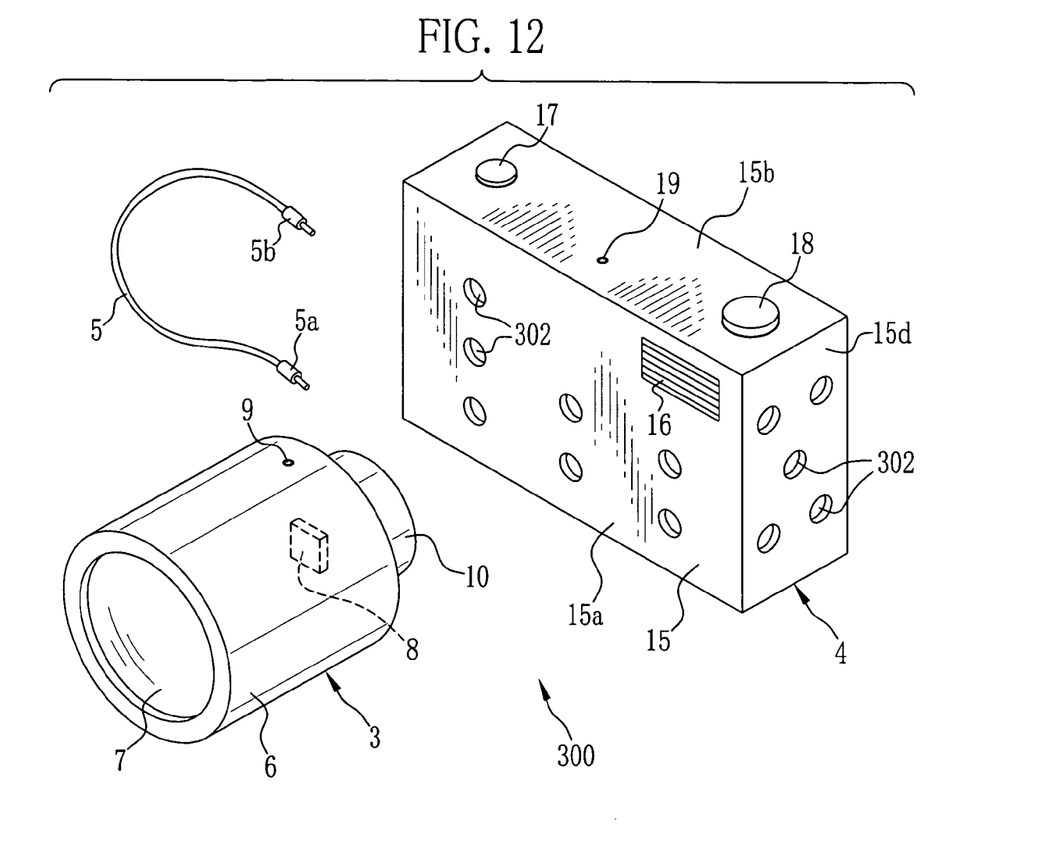
FIG. 12 is a perspective view of the camera system of a fourth embodiment.
Figure 13:
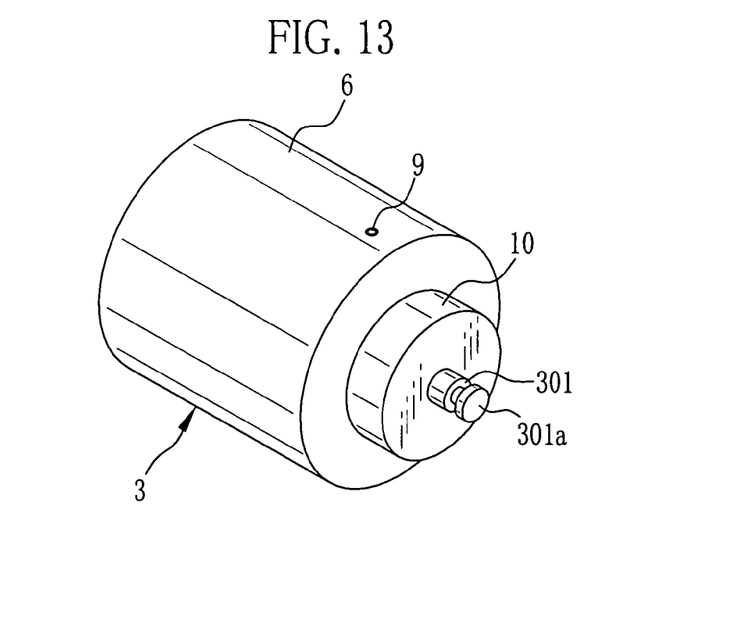
FIG. 13 is a perspective view of the lens unit of the fourth embodiment.

As shown in FIG. 12, the camera system 300 is composed of the lens unit 3 and the camera body 4. As shown in FIG. 13, a lock pin (attachment member) 301 is fixed to the rear surface of the protrusion 10 of the lens unit 3. An end portion of the lock pin 301 has a larger diameter and is referred to as diameter expansion portion 301a.

As shown in FIG. 12, through holes 302 are formed in the front wall 15a and the side wall 15d of the case 15 of the camera body 4. Although illustration is omitted in FIG. 12, through holes are formed in the rear wall 15c (see FIG. 3) and the bottom wall 15e (see FIGS. 1 and 3) of the case 15 as well. A diameter of each through hole 302 is slightly larger than the diameter of the expansion portion 301a of the lock pin 301.

Figure 14:
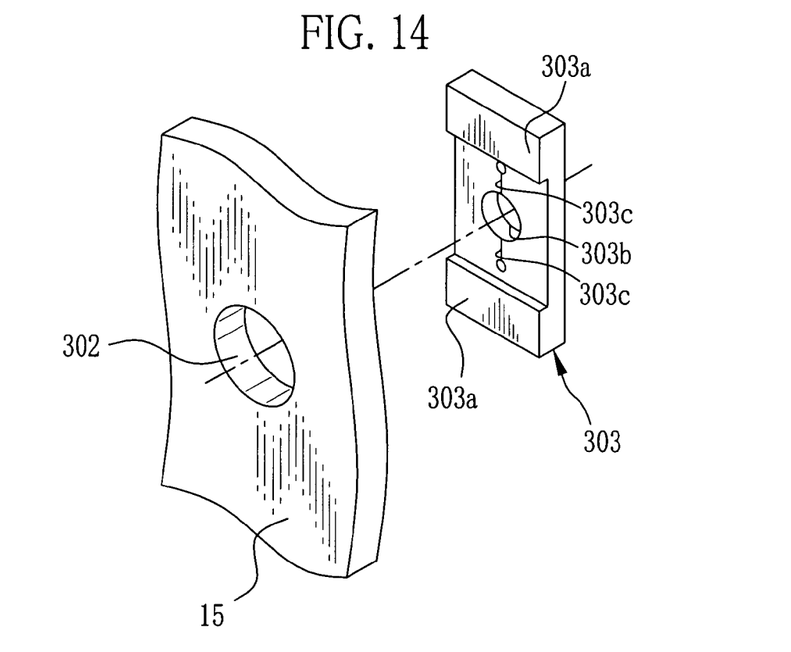
FIG. 14 is an explanatory illustration showing a structure of a lock member.

The rear side of each wall of the case 15 is provided with lock members 303 so as to correspond to the respective through holes 302 such as shown in FIG. 14. The lock member 303 is made of a rubber material and includes convex portions 303a, which are formed at both end portions, and a lock hole 303b formed in a central portion. A diameter of the lock hole 303b is adapted to be smaller than the diameter of the expansion portion 301a (see FIG. 13) of the lock pin 301. At the periphery of the lock hole 303b, slits 303c are formed so as to extend in a vertical direction. The lock member 303 is fixed to the rear of each wall. The through hole 302 and the lock member 303 constitute a component to be attached.

Figure 15:
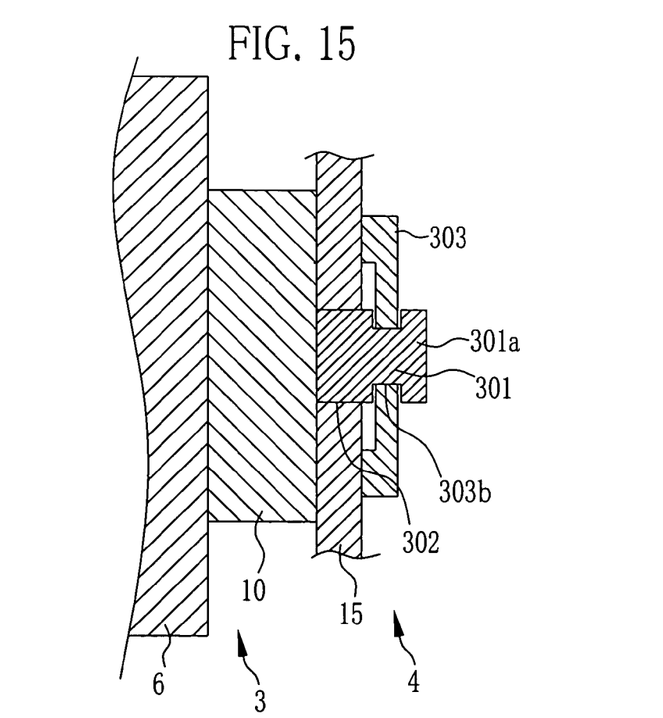
FIG. 15 is an explanatory illustration showing a state in that a lock pin is fitted into the lock member.

The lock pin 301 of the lens unit 3 is inserted into the through hole 302 of the camera body 4, and then the lock pin 301 is pushed. At this time, the diameter expansion portion 301a is pressed against the lock member 303 to open the slits 303c (see FIG. 14), and the diameter expansion portion 301a engages with lock hole 303b such as shown in FIG. 15. In this way, the lens unit 3 is attached to the camera body 4. Meanwhile, upon pulling the lens unit 3 from the camera body 4, the diameter expansion portion 301*a* of the lock pin 301 is separated from the lock hole 303*b* so that the lens unit 3 is detached from the camera body 4. The shooter can attach the lens unit 3 to any through hole 302 of the case 15. This attaching operation is very easy.

As described above, according to the camera system of the present invention, it is possible to easily attach the lens unit to any position of the camera body in accordance with a choice of the shooter. Thus, usability of the camera system is improved.

Incidentally, the structure of the attachment member is not limited to the above. Further, the camera system of the fourth embodiment may adopt the cableless manner described in the first embodiment and may comprise the detector for detecting the attachment of the lens unit, which is also described in the first embodiment.

In the above (first to fourth) embodiments, still images are recorded. However, moving images may be recorded.

In the above embodiments, the electronics device to which the lens unit is attached is the camera body. However, the electronics device may be a personal computer, a television, a cell-phone, a gaming device and so forth. The lens unit may be attached to the other electronics devices in which function is widened by attaching the lens unit. Incidentally, the shapes of the lens unit and the electronics device are not limited to the above embodiments.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera system comprising:
   a lens unit containing a taking lens and an imaging device disposed behind said taking lens;
   an electronics device to which said lens unit is attached;
   an attachment device for enabling said lens unit to be attached to different positions of an outer surface of said electronics device on condition that functions of said electronics device are not disturbed;
   a communication device for performing data communication between said lens unit and said electronics device; and
   a display equipped in said electronics device, said display capturing image data of said imaging device via said communication device to display said image data as an image,
   wherein said attachment device comprises a magnet disposed at one of outer surfaces of said lens unit and said electronics device, and a magnetic material disposed at the other of said outer surfaces thereof, and
   wherein said magnet is embedded in a rear end of said lens unit.

2. A camera system according to claim 1, wherein said attachment device comprises an adhesive member pasted to one of outer surfaces of said lens unit and said electronics device.

3. A camera system according to claim 2, wherein said adhesive member is a two-sided adhesive tape attached to a rear surface of said lens unit.

4. A camera system according to claim 1, wherein said attachment device comprises a first engagement member disposed at an outer surface of said lens unit, and a plurality of second engagement members disposed at said electronics device, said first engagement member being selectively and detachably attached to one of said second engagement members.

5. A camera system according to claim 1, wherein said electronics device includes a recorder for recording said image data captured via said communication device.

6. A camera system according to claim 1, further comprising:
   an attachment detection device for detecting said lens unit attached to said electronics device; and
   a controller for executing a preparative operation for shooting on the basis of a detection result of said attachment detection device.

7. A camera system according to claim 1, further comprising:
   a power transfer device for transferring an electric power from said electronics device to said lens unit.

8. A camera system according to claim 7, wherein said power transfer device is a cable, one end of which is connected to said lens unit and the other end of which is connected to said electronics device.

9. A camera system according to claim 7, wherein said power transfer device transfers said electric power in a cableless manner utilizing electromagnetic induction.

10. A camera system according to claim 1, wherein said communication device performs said data communication by means of radio communication.

11. A camera system comprising:
    a lens unit containing a taking lens and an imaging device disposed behind said taking lens;
    an electronics device to which said lens unit is attached;
    an attachment device for enabling said lens unit to be attached to different positions of an outer surface of said electronics device on condition that functions of said electronics device are not disturbed;
    a communication device for performing data communication between said lens unit and said electronics device; and
    a display equipped in said electronics device, said display capturing image data of said imaging device via said communication device to display said image data as an image,
    wherein said attachment device comprises a first sheet attached to one of outer surfaces of said lens unit and said electronics device, and a second sheet attached to the other of said outer surfaces thereof, a plurality of hooks being formed on said first sheet and a plurality of loops being formed on said second sheet to engage with said hooks.

12. A camera system according to claim 11, wherein said first and second sheets are hook and loop fasteners made of resin.

13. A camera system according to claim 11, wherein said first sheet is attached to a rear surface of said lens unit.

14. A camera system comprising:
    a lens unit containing a taking lens and an imaging device disposed behind said taking lens;
    an electronics device to which said lens unit is attached;
    an attachment device for enabling said lens unit to be attached to different of an outer surface of said electronics device on condition that functions of said electronics device are not disturbed;
    a communication device for performing data communication between said lens unit and said electronics device; and a display equipped in said electronics device, said display capturing image data of said imaging device via said communication device to display said image data as an image, wherein said attachment device comprises a first engagement member disposed at an outer surface of said lens unit, and a plurality of second engagement members disposed at said electronics device, said first engagement member being selectively and detachably attached to one of said second engagement members, and wherein said first engagement member is a lock pin disposed on a rear surface of said lens unit.

15. A camera system according to claim 14, wherein each of said second engagement members comprises:

a through hole formed in the outer surface of said electronics device and into which said lock pin is inserted; and a lock member disposed at a rear side of said through hole to engage with said lock pin.

16. A camera system according to claim 15, wherein said lock pin has a flange portion to engage with said lock member.

17. A camera system according to claim 16, wherein said lock member is made of a rubber material and has a lock hole into which said flange portion is inserted.

18. A camera system according to claim 17, wherein said lock hole is provided with slits formed at a surrounding area thereof, said slit being adapted to be opened when said flange portion passes through said lock hole.

19. A camera system comprising:

a lens unit containing a taking lens and an imaging device disposed behind said taking lens;

an electronics device to which said lens unit is attached;

an attachment device for enabling said lens unit to be attached to different positions of an outer surface of said electronics device on condition that functions of said electronics device are not disturbed;

a communication device for performing data communication between said lens unit and said electronics device;

a display equipped in said electronics device, said display capturing image data of said imaging device via said communication device to display said image data as an image;

an attachment detection device for detecting said lens unit attached to said electronics device; and a controller for executing a preparative operation for shooting on the basis of a detection result of said attachment detection device, wherein said attachment detection device comprises a plurality of hall elements disposed at an inner side of said electronics device, and one of said hall elements detects a magnet embedded in said lens unit to detect said lens unit attached to said electronics device.

* * * * *